United States Patent
Fan et al.

(10) Patent No.: US 12,395,239 B2
(45) Date of Patent: Aug. 19, 2025

(54) OPTICAL POWER VALUE TRANSMISSION METHOD AND SYSTEM, AND RELATED DEVICE

(71) Applicant: HUAWEI TECHNOLOGIES CO., LTD., Shenzhen (CN)

(72) Inventors: Minghui Fan, Dongguan (CN); Zhe Liu, Wuhan (CN); Jiangbo Feng, Jakarta (ID)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 18/070,709

(22) Filed: Nov. 29, 2022

(65) Prior Publication Data

US 2023/0087547 A1   Mar. 23, 2023

Related U.S. Application Data

(63) Continuation of application No. PCT/CN2021/094545, filed on May 19, 2021.

(30) Foreign Application Priority Data

Jun. 2, 2020 (CN) .......................... 202010489217.9

(51) Int. Cl.
*H04B 10/077* (2013.01)
*H04J 14/02* (2006.01)

(52) U.S. Cl.
CPC .......... *H04B 10/0775* (2013.01); *H04J 14/02* (2013.01)

(58) Field of Classification Search
None
See application file for complete search history.

(56) References Cited

U.S. PATENT DOCUMENTS

| 10,038,494 B1 | 7/2018 | Paraschis et al. |
| 10,932,019 B1* | 2/2021 | Marti ................. H04Q 11/0005 |
| 2004/0202468 A1* | 10/2004 | Harney ............... H04J 14/0227 398/16 |

(Continued)

OTHER PUBLICATIONS

Medhi, Von Neumann Architecture, 2012 (Year: 2012).*

(Continued)

*Primary Examiner* — Jai M Lee
(74) *Attorney, Agent, or Firm* — HAUPTMAN HAM, LLP

(57) ABSTRACT

An optical power value transmission method includes obtaining optical multiplexing section link information, determining a first output port of the source network device based on the optical multiplexing section link information, obtaining a first output power value of an optical signal, and sending the first output power value to the downstream network device by the first optical fiber. The optical multiplexing section link information is useable to indicate an optical fiber connection relationship between two adjacent network devices between a source network device and a target network device. An optical multiplexing section includes two adjacent network devices, the source network device and the target network device. The source network device and the target network device are in different data communication networks. The downstream network device is connected to the source network device, and is indicated by the optical multiplexing section link information.

12 Claims, 8 Drawing Sheets

(56) References Cited

U.S. PATENT DOCUMENTS

2010/0226644 A1\* 9/2010 Ito .................. H04B 10/0775
398/25
2020/0099455 A1\* 3/2020 Sun ................. H04B 10/07955

OTHER PUBLICATIONS

Extended European Search Report issued in corresponding European Application No. 21817802.8, dated Oct. 11, 2023, pp. 1-9.
Chinese Office Action issued in corresponding Chinese Application No. 202010489217.9, dated Apr. 28, 2022, pp. 1-11.

\* cited by examiner

OPTICAL POWER VALUE TRANSMISSION METHOD AND SYSTEM, AND RELATED DEVICE

CROSS-REFERENCE TO RELATED APPLICATIONS

This application is a continuation of International Application No. PCT/CN2021/094545, filed on May 19, 2021, which claims priority to Chinese Patent Application No. 202010489217.9, filed on Jun. 2, 2020. The disclosures of the aforementioned applications are hereby incorporated by reference in their entireties.

TECHNICAL FIELD

This application relates to the field of optical fiber communication, and in particular, to an optical power value transmission method and system, and a related device.

BACKGROUND

To ensure successful transmission of an optical signal between an upstream network device and a downstream network device, operation and maintenance need to be performed on an optical fiber connected between the upstream network device and the downstream network device, for example, optical fiber attenuation of the optical fiber needs to be detected.

In the conventional technology, to implement operation and maintenance on the optical fiber connected between the upstream network device and the downstream network device, the upstream network device needs to send, to the downstream network device by using the optical fiber, an output power value of the optical signal output from the upstream network device. When the upstream network device and the downstream network device are located in different data communication networks (data communication networks, DCN), to transmit the output power value, routing information needs to be manually configured in the upstream network device, where the routing information is used to indicate an optical fiber connection relationship between the upstream network device and the downstream network device, and the upstream network device may send, based on the routing information, the output power value to the downstream network device indicated by the routing information.

However, manually configuring routing information is very cumbersome. This reduces efficiency and accuracy of obtaining the output power value.

SUMMARY

Embodiments of the present invention provide an optical power value transmission method and system, and a related device, to improve efficiency and accuracy of obtaining an output power value.

According to a first aspect, this application provides an optical power value transmission method. The method includes: A source network device obtains optical multiplexing section link information, where the optical multiplexing section link information is used to indicate an optical fiber connection relationship between any two adjacent network devices between the source network device and a target network device that are included in an optical multiplexing section, and the source network device and the target network device are located in different data communication networks DCN; the source network device determines a first output port of the source network device based on the optical multiplexing section link information, where the first output port is connected to a downstream network device by using a first optical fiber, and the downstream network device is a network device that is connected to the source network device and that is indicated by the optical multiplexing section link information; the source network device obtains, on the first output port, a first output power value of an optical signal; and the source network device sends the first output power value to the downstream network device by using the first optical fiber.

It can be learned that, when manual input of routing information is not required, the source network device can automatically discover the target network device based on the optical multiplexing section link information, to further implement operation and maintenance on the optical multiplexing section. For example, the source network device sends the output power value to the downstream network device, to detect optical fiber attenuation of the optical fiber connected between any two adjacent network devices that are included in the optical multiplexing section, and the like, to improve efficiency and accuracy of detecting optical fiber attenuation.

Based on the first aspect, in an optional implementation, that the source network device sends the first output power value to the downstream network device by using the first optical fiber includes: The source network device sends a first optical supervisory channel OSC by using the first optical fiber, where the first OSC carries the first output power value by using target bandwidth, and the target bandwidth is not occupied by a DCN channel.

It can be learned that, the first output power value is transmitted by using the target bandwidth of the first OSC, and the target bandwidth is not occupied by the DCN channel, to effectively avoid impact of transmission of the first output power value on the DCN channel of the first OSC, thereby improving utilization of bandwidth of the DCN channel.

Based on the first aspect, in an optional implementation, before the source network device sends the first output power value to the downstream network device by using the first optical fiber, the method further includes: The source network device obtains a plurality of first output power values within a first preset time period; and the source network device determines whether that an absolute value of a difference between two of the plurality of first output power values is greater than or equal to a first preset value.

It can be learned that, before the source network device sends the first output power value to the downstream network device, if a deterioration risk of the first optical fiber is high (to be specific, the absolute value of the difference between the two first output power values within the first preset time period is greater than or equal to the first preset value), the source network device may immediately send the first output power value to the downstream network device, to enable the downstream network device to detect optical fiber attenuation of the first optical fiber, to determine whether the first optical fiber deteriorates, thereby improving timeliness of warning whether the first optical fiber deteriorates.

Based on the first aspect, in an optional implementation, that the source network device determines whether that an absolute value of a difference between two of the plurality of first output power values is greater than or equal to a first preset value includes: The source network device determines whether that the absolute value of the difference between the first output power value with a largest value and the first output power value with a smallest value in the plurality of first output power values is greater than or equal to the first preset value.

It can be learned that, the source network device determines, based on the absolute value of the difference between the first output power value with the largest value and the first output power value with the smallest value, whether to immediately send the first output power value to the downstream network device, to improve accuracy of detecting whether the first optical fiber deteriorates.

Based on the first aspect, in an optional implementation, that the source network device sends the first output power value to the downstream network device by using the first optical fiber includes: If the source network device determines that the absolute value of the difference between the first output power value with the largest value and the first output power value with the smallest value in the plurality of first output power values is less than the first preset value, the network device sends the first output power value to the downstream network device every other second preset time period, where the second preset time period is greater than the first preset time period.

It can be learned that, if the deterioration risk of the first optical fiber is low (to be specific, the absolute value of the difference between the two first output power values within the first preset time period is less than the first preset value), the source network device may periodically send the first output power value to the downstream network device, to reduce a data volume of the output power value sent by the source network device to an intermediate network device, thereby reducing a data volume that the intermediate network device needs to process.

According to a second aspect, this application provides an optical power value transmission method. The method includes: A network device receives a second output power value from an upstream network device by using a second optical fiber, where the second output power value is a power value that is of an optical signal and that is obtained on an output port of the upstream network device, and the second optical fiber is an optical fiber connected between an input port of the network device and the upstream network device; the network device determines, based on the input port and optical multiplexing section link information, that the network device is a target network device indicated by the optical multiplexing section link information, where the optical multiplexing section link information is used to indicate an optical fiber connection relationship between any two adjacent network devices between a source network device and the target network device that are included in an optical multiplexing section, and the source network device and the target network device are located in different data communication networks DCN; and the network device obtains, on the input port, an input power value of the optical signal.

It can be learned that, when the network device determines, based on the input port and the optical multiplexing section link information, that the network device is a last network device (namely, the target network device) indicated by the optical multiplexing section link information, the network device no longer forwards the second output power value from the upstream network device to another network device, to complete detecting the optical fiber connected between any two adjacent network devices included in the optical multiplexing section.

Based on the second aspect, in an optional implementation, that a network device receives a second output power value from an upstream network device by using a second optical fiber includes: The network device receives a second OSC by using the second optical fiber, where the second OSC carries the second output power value by using target bandwidth, and the target bandwidth is not occupied by a DCN channel.

It can be learned that, the second output power value is transmitted by using the target bandwidth of the second OSC of the second optical fiber, and the target bandwidth is not occupied by the DCN channel, to effectively avoid impact of transmission of the second output power value on the DCN channel of the second OSC, thereby improving utilization of bandwidth of the DCN channel.

Based on the second aspect, in an optional implementation, after the network device obtains, on the input port, the input power value of the optical signal, the method further includes: The network device obtains optical fiber attenuation of the second optical fiber at least based on the second output power value and the input power value.

It can be learned that, the network device may detect, based on the second output power value and the input power value that is detected on the input port of the network device, the optical fiber attenuation that passes through the second optical fiber (connected between the target network device and the upstream network device) and that is included in the optical multiplexing section.

Based on the second aspect, in an optional implementation, the optical multiplexing section includes at least one intermediate network device connected between the source network device and the target network device. The upstream network device is the intermediate network device connected to the target network device. The method further includes: The network device receives target optical fiber attenuation by using the second optical fiber, where the target optical fiber attenuation is optical fiber attenuation of a first optical fiber connected between the source network device and the intermediate network device, and/or, the target optical fiber attenuation is optical fiber attenuation of an optical fiber connected between the two adjacent intermediate network devices.

It can be learned that, the network device can receive the target optical fiber attenuation by using the second optical fiber, to further enable the network device to obtain the optical fiber attenuation that is of the optical fiber connected between any two adjacent network devices and that is included in the optical multiplexing section, thereby implementing detection on the optical multiplexing section.

Based on the second aspect, in an optional implementation, the optical multiplexing section includes at least one intermediate network device connected between the source network device and the target network device. The upstream network device is the intermediate network device connected to the target network device. The method further includes: The network device receives a target input power value and a target output power value of a target optical fiber by using the second optical fiber, where the target input power value is a power value that is of the optical signal and that is input to the target optical fiber, the target output power value is a power value that is of the optical signal and that is output from the target optical fiber, and the target optical fiber is a first optical fiber connected between the source network device and the intermediate network device, and/or, the target optical fiber is an optical fiber connected between the two adjacent intermediate network devices; and the network device obtains optical fiber attenuation of the target optical fiber at least based on the target input power value and the target output power value.

It can be learned that, the network device calculates, by using the received target input power value and target output power value, the optical fiber attenuation that is of the optical fiber connected between any two adjacent network devices and that is included in the optical multiplexing section, to implement detection on the optical multiplexing section.

According to a third aspect, this application provides a network device. The network device is a source network device, and the network device includes: a processing unit, configured to obtain optical multiplexing section link information, where the optical multiplexing section link information is used to indicate an optical fiber connection relationship between any two adjacent network devices between the source network device and a target network device that are included in an optical multiplexing section, and the source network device and the target network device are located in different data communication networks DCN; the processing unit is further configured to determine a first output port of the source network device based on the optical multiplexing section link information, where the first output port is connected to a downstream network device by using a first optical fiber, and the downstream network device is a network device that is connected to the source network device and that is indicated by the optical multiplexing section link information; and the processing unit is further configured to obtain, on the first output port, a first output power value of an optical signal; and a sending unit, configured to send the first output power value to the downstream network device by using the first optical fiber. For descriptions of the beneficial effects shown in this aspect, refer to the foregoing first aspect for details. Details are not described.

Based on the third aspect, in an optional implementation, the sending unit is specifically configured to: send a first optical supervisory channel OSC by using the first optical fiber, where the first OSC carries the first output power value by using target bandwidth, and the target bandwidth is not occupied by a DCN channel.

Based on the third aspect, in an optional implementation, the processing unit is further configured to: obtain a plurality of first output power values within a first preset time period; and determine whether that an absolute value of a difference between two of the plurality of first output power values is greater than or equal to a first preset value.

Based on the third aspect, in an optional implementation, the processing unit is specifically configured to determine whether that the absolute value of the difference between the first output power value with a largest value and the first output power value with a smallest value in the plurality of first output power values is greater than or equal to the first preset value.

Based on the third aspect, in an optional implementation, the sending unit is specifically configured to: if the source network device determines that the absolute value of the difference between the first output power value with the largest value and the first output power value with the smallest value in the plurality of first output power values is less than the first preset value, send the first output power value to the downstream network device every other second preset time period, where the second preset time period is greater than the first preset time period.

According to a fourth aspect, this application provides a network device. The network device includes: a receiving unit, configured to receive a second output power value from an upstream network device by using a second optical fiber, where the second output power value is a power value that is of an optical signal and that is obtained on an output port of the upstream network device, and the second optical fiber is an optical fiber connected between an input port of the network device and the upstream network device; and a processing unit, configured to determine, based on the input port and optical multiplexing section link information, that the network device is a target network device indicated by the optical multiplexing section link information, where the optical multiplexing section link information is used to indicate an optical fiber connection relationship between any two adjacent network devices between a source network device and the target network device that are included in an optical multiplexing section, and the source network device and the target network device are located in different data communication networks DCN; and the processing unit is further configured to obtain, on the input port, an input power value of the optical signal.

Based on the fourth aspect, in an optional implementation, the receiving unit is specifically configured to: receive a second OSC by using the second optical fiber, where the second OSC carries the second output power value by using target bandwidth, and the target bandwidth is not occupied by a DCN channel.

Based on the fourth aspect, in an optional implementation, the processing unit is further configured to: obtain optical fiber attenuation of the second optical fiber at least based on the second output power value and the input power value.

Based on the fourth aspect, in an optional implementation, the optical multiplexing section includes at least one intermediate network device connected between the source network device and the target network device. The upstream network device is the intermediate network device connected to the target network device. The receiving unit is further configured to receive target optical fiber attenuation by using the second optical fiber, where the target optical fiber attenuation is optical fiber attenuation of a first optical fiber connected between the source network device and the intermediate network device, and/or, the target optical fiber attenuation is optical fiber attenuation of an optical fiber connected between the two adjacent intermediate network devices.

Based on the fourth aspect, in an optional implementation, the optical multiplexing section includes at least one intermediate network device connected between the source network device and the target network device. The upstream network device is the intermediate network device connected to the target network device. The receiving unit is further configured to receive a target input power value and a target output power value of a target optical fiber by using the second optical fiber, where the target input power value is a power value that is of the optical signal and that is input to the target optical fiber, the target output power value is a power value that is of the optical signal and that is output from the target optical fiber, and the target optical fiber is a first optical fiber connected between the source network device and the intermediate network device, and/or, the target optical fiber is an optical fiber connected between the two adjacent intermediate network devices; and the processing unit is further configured to obtain optical fiber attenuation of the target optical fiber at least based on the target input power value and the target output power value.

According to a fifth aspect, this application provides a network device, including a processor, a memory, and a transmitter, where the memory and the processor are interconnected by using a line, the transmitter and the processor are interconnected by using a line, and the memory stores instructions. The processor is configured to perform the processing-related steps shown in any implementation of the first aspect, and the transmitter is configured to perform the sending-related steps shown in any implementation of the first aspect.

Specifically, the processor is configured to perform the step of obtaining optical multiplexing section link information, where the optical multiplexing section link information is used to indicate an optical fiber connection relationship between any two adjacent network devices between the source network device and a target network device that are included in an optical multiplexing section, and the source network device and the target network device are located in different data communication networks DCN; the processor is further configured to perform the step of determining a first output port of the source network device based on the optical multiplexing section link information, where the first output port is connected to a downstream network device by using a first optical fiber, and the downstream network device is a network device that is connected to the source network device and that is indicated by the optical multiplexing section link information; the processor is further configured to perform the step of obtaining, on the first output port, a first output power value of an optical signal; and the transmitter is configured to perform the step of sending the first output power value to the downstream network device by using the first optical fiber.

According to a sixth aspect, this application provides a network device, including a processor, a memory, and a receiver, where the memory and the processor are interconnected by using a line, the receiver and the processor are interconnected by using a line, the memory stores instructions, and the processor is configured to perform the processing-related steps shown in any implementation of the second aspect; and the receiver is configured to perform the receiving-related steps shown in any implementation of the second aspect.

Specifically, the receiver is configured to perform the step of receiving a second output power value from an upstream network device by using a second optical fiber, where the second output power value is a power value that is of an optical signal and that is obtained on an output port of the upstream network device, and the second optical fiber is an optical fiber connected between an input port of the network device and the upstream network device; the processor is configured to perform the step of determining, based on the input port and optical multiplexing section link information, that the network device is a target network device indicated by the optical multiplexing section link information, where the optical multiplexing section link information is used to indicate an optical fiber connection relationship between any two adjacent network devices between a source network device and the target network device that are included in an optical multiplexing section, and the source network device and the target network device are located in different data communication networks DCN; and the processor is further configured to perform the step of obtaining, on the input port, an input power value of the optical signal.

According to a seventh aspect, this application provides an optical communications system. The optical communications system includes at least a source network device and a target network device, the source network device is shown in any implementation of the third aspect, and the target network device is shown in any implementation of the fourth aspect.

According to an eighth aspect, an embodiment of this application provides a digital processing chip. The chip includes a processor, a memory, and a transmitter, the memory and the processor are interconnected by using a line, the processor and the transmitter are interconnected by using a line, the memory stores instructions, and the processor and the transmitter are shown in the fifth aspect.

According to a ninth aspect, an embodiment of this application provides a digital processing chip. The chip includes a processor, a memory, and a receiver, where the memory and the processor are interconnected by using a line, the processor and the receiver are interconnected by using a line, the memory stores instructions, and the processor and the receiver are shown in the sixth aspect.

According to a tenth aspect, this application provides a readable storage medium, including instructions. When the instructions are run on an apparatus, the apparatus is enabled to perform the method according to any implementation of the first aspect or the second aspect.

According to an eleventh aspect, this application provides a program product including instructions. When the instructions are run on an apparatus, the apparatus is enabled to perform the method according to any implementation of the first aspect or the second aspect.

DESCRIPTION OF EMBODIMENTS

The following clearly describes the technical solutions in embodiments of the present invention with reference to the accompanying drawings in embodiments of the present invention. It is clear that the described embodiments are merely a part rather than all of embodiments of the present invention. All other embodiments obtained by a person of ordinary skill in the art based on embodiments of the present invention without creative efforts shall fall within the protection scope of the present invention.

The term "and/or" in this application describes only an association relationship for describing associated objects and represents that three relationships may exist. For example, A and/or B may represent the following three cases: Only A exists, both A and B exist, and only B exists. In addition, in the specification, claims, and accompanying drawings of this application, the terms "first", "second", and so on are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein.

To better understand an optical power value transmission method shown in this application, the following first describes a scenario to which the optical power value transmission method shown in this application is applied. The method shown in this embodiment is applied to an optical multiplexing section (optical multiplexing section, OMS) that crosses two different DCNs.

Figure 1:
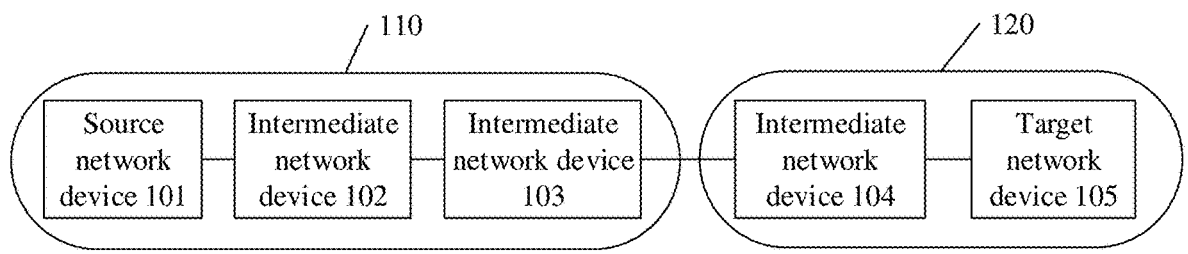
FIG. 1 is a schematic diagram of a structure of an embodiment of an optical multiplexing section according to this application.

Specifically, the OMS includes a plurality of network devices that are sequentially connected, and in a transmission process of an optical signal in the OMS, the optical signal sequentially passes through the plurality of network devices included in the OMS. A specific quantity of the network devices that are sequentially connected and included in the OMS is not limited in this embodiment. In this embodiment, FIG. 1 is used as an example. It can be learned that, an example in which OMS includes five network devices (namely, a network device 101 to a network device 105) that are sequentially connected to each other is used for description.

A specific device type of the network device is not limited in this embodiment. For example, the network device is an optical cross connect (optical cross connect, OXC) device, an optical add drop multiplexer (optical add drop multiplexer, OADM), a fixed optical add drop multiplexer (fixed optical add drop multiplexer, FOADM), a reconfigurable optical add drop multiplexer (reconfigurable optical add drop multiplexer, ROADM), or the like. In this embodiment, an example in which the network device is an ROADM is used for description.

This embodiment is described by using an example in which the OMS includes a source network device 101, an intermediate network device 102, an intermediate network device 103, an intermediate network device 104, and a target network device 105. The source network device 101 is configured to transmit an optical signal locally generated by a client device A or the source network device 101 to the target network device 105 through each intermediate network device (the intermediate network devices 102, 103, and 104) included in the OMS, and the target network device 105 receives the optical signal from the source network device 101, directly forwards the optical signal or demodulates the optical signal and then forwards the optical signal to a client device B. In this embodiment, an example in which a plurality of intermediate network devices that are sequentially connected are included between the source network device 101 and the target network device 105 that are included in the OMS is used for description. In another example, the source network device 101 may alternatively directly send the optical signal to the target network device 105 without forwarding by the intermediate network devices.

That the OMS crosses two different DCNs in this embodiment means that the source network device 101 and the target network device 105 shown in this embodiment are located in two different DCNs. Specifically, in this embodiment, the source network device 101, the intermediate network device 102, and the intermediate network device 103 are located in a first DCN 110, the intermediate network device 104 and the target network device 105 are located in a second DCN 120, and the first DCN 110 and the second DCN 120 are two DCNs that are different from each other.

Based on the foregoing description of the OMS, an objective of using the optical power value transmission method provided in this application is to automatically discover the target network device by the source network device in a scenario in which the OMS crosses DCNs, to further implement operation and maintenance on an optical fiber connected between any two adjacent network devices included in the OMS. The operation and maintenance shown in this application include but are not limited to detecting the optical fiber connected between any two adjacent network devices included in the OMS, to obtain optical fiber attenuation, so that before the optical fiber attenuation deteriorates to damage service transmission, pre-warning of optical fiber deterioration is performed, to reduce an optical fiber deterioration fault risk, reduce operation and maintenance costs, and improve operation and maintenance efficiency. In the example shown in FIG. 1, optical fiber attenuation of an optical fiber connected between the intermediate network device 102 and the intermediate network device 103 can be detected by using the method shown in this application, so that whether the optical fiber connected between the intermediate network device 102 and the intermediate network device 103 deteriorates, is broken, is faulty, or is dirty is determined based on the optical fiber attenuation. The description of operation and maintenance in this embodiment is an optional example, and details are not limited in this application. As shown in the following, an example in which the operation and maintenance shown in this embodiment are detecting optical fiber attenuation of the optical fiber connected between any two adjacent network devices included in the OMS is used for description.

Figure 2:
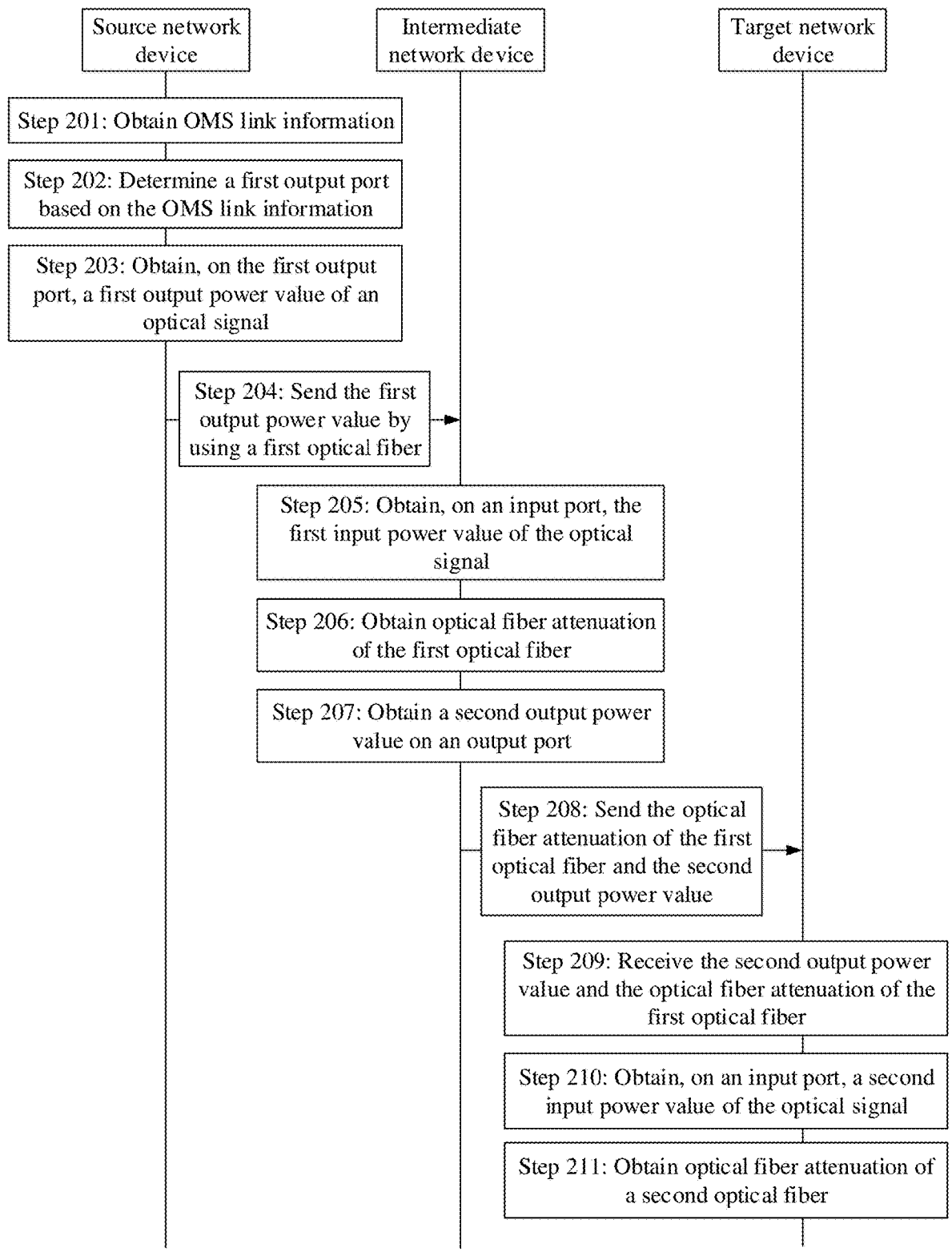
FIG. 2 is a flowchart of steps of an embodiment of an optical power value transmission method according to this application.

The following describes a specific execution process of the optical power value transmission method provided in this embodiment with reference to FIG. 2.

Step 201: A source network device obtains OMS link information.

Figure 3:
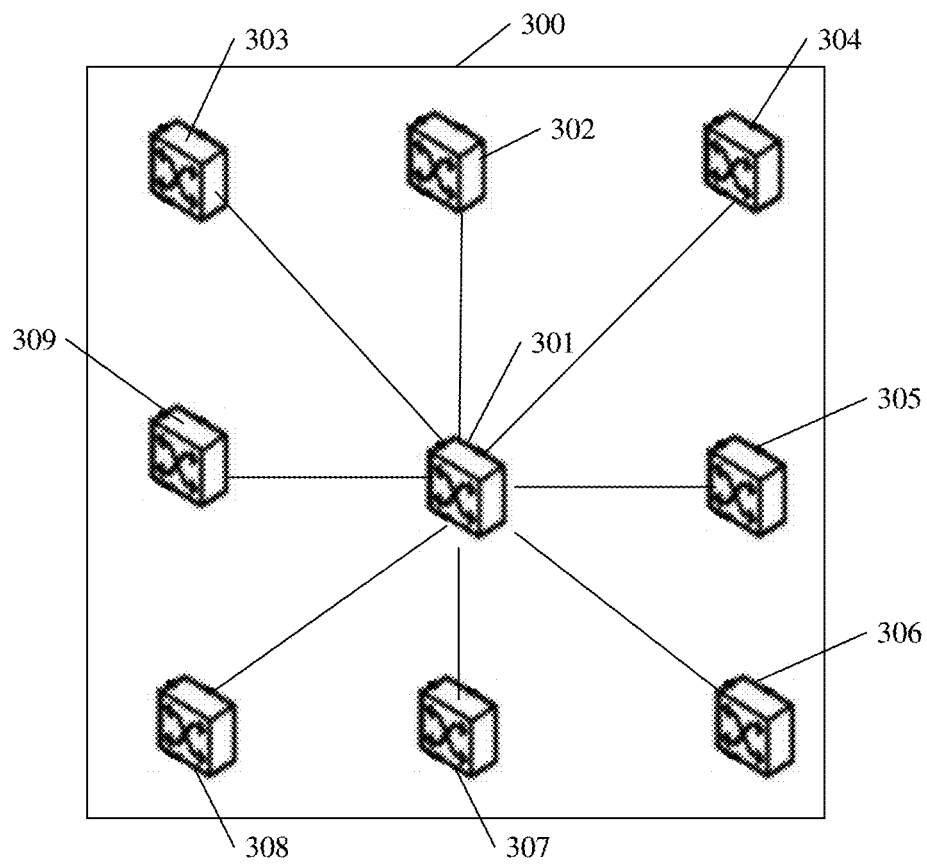
FIG. 3 is a schematic diagram of a partial structure of an embodiment of a source network device according to this application.

To better understand the OMS link information shown in this embodiment, a structure of the source network device provided in this embodiment is first described by using an example with reference to FIG. 3. FIG. 3 is a schematic diagram of a partial structure of an embodiment of the source network device according to this embodiment. As shown in FIG. 3, the source network device shown in this embodiment includes N wavelength selective switches (wavelength selective switch, WSS). A specific value of N is not limited in this embodiment. As shown in FIG. 3, an example in which N is equal to 9 is used for description. That is, the source network device 300 shown in this embodiment includes nine WSSs (namely, a WSS 301, a WSS 302, . . . , and a WSS 309). The WSS 301 is connected to the WSS 302, WSS 303, . . . , and WSS 309 located at different locations by using optical fibers, and is configured to send an optical signal of the source network device 300 (for example, an optical signal locally generated by the source network device 300) to the other WSSs (namely, the WSS 302, the WSS 303, . . . , and the WSS 309) located at different locations, to transmit the optical signal in different dimension directions. For example, if the source network device 300 needs to transmit the optical signal in a first dimension direction, the WSS 301 transmits the optical signal to the WSS 302; or if the source network device 300 needs to transmit the optical signal in a second dimension direction, the WSS 301 transmits the optical signal to the WSS 303. The first dimension direction and the second dimension direction are two dimension directions that are different from each other.

Optionally, the WSS 301 is connected to one or more service boards. A specific quantity of service boards is not limited in this embodiment, and the service boards are configured to generate optical signals.

It should be clearly noted that in this embodiment, an example in which the WSS 301 is directly connected, by using optical fibers, to the WSSs (namely, the WSS 302, the WSS 303, . . . , and the WSS 309) that are configured to output the optical signal from the source network device 300 and that are located at different locations is used for description. In another example, using the WSS 301 and the WSS 309 as an example, one or more WSSs, and/or a device, for example, an optical amplifier that is connected between the WSS 301 and the WSS 309 and that is configured to amplify energy of the optical signal may be further connected between the WSS 301 and the WSS 309. This is not specifically limited in this embodiment.

It can be learned that flexible scheduling of the optical signal in different dimension directions is implemented by using the two WSSs included in the source network device 300 shown in this embodiment. To be specific, the source network device 300 shown in FIG. 3 transmits the optical signal in eight different dimension directions by using eight WSSs (namely, the WSS 302, the WSS 303, . . . , and the WSS 309) located at different locations.

Figure 4:
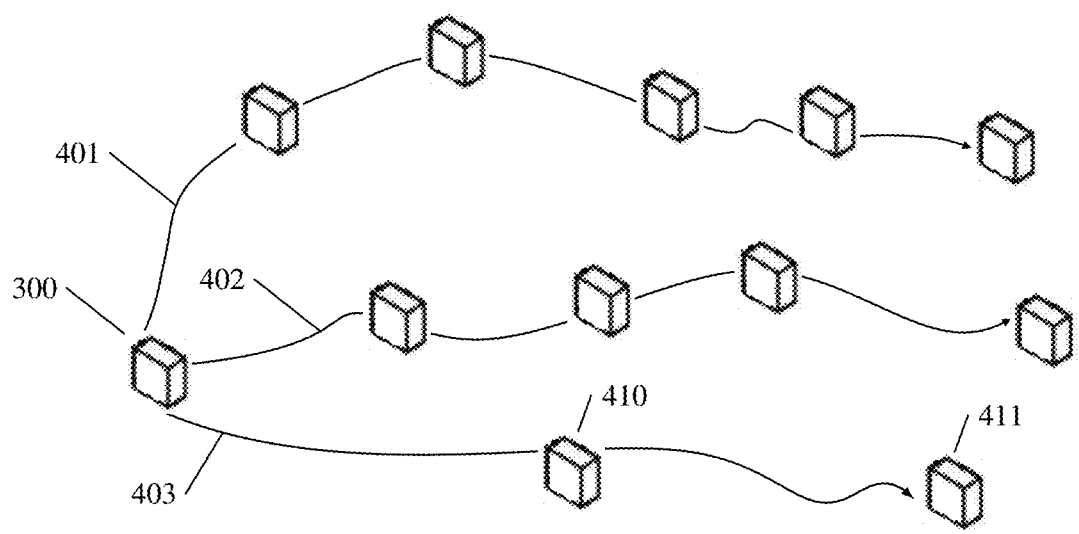
FIG. 4 is a schematic diagram of transmission of an optical signal along different optical multiplexing sections according to this application.

The source network device shown in this embodiment may store a plurality of pieces of OMS link information, and different OMS link information is used to indicate different OMSs. Specifically, each OMS indicated by the OMS link information includes the source network device. The OMS further includes an optical fiber connection relationship between any two adjacent network devices. It can be learned that different OMS link information included in the source network device is used to indicate paths on which the optical signal is transmitted along different OMSs. For better understanding, the following provides description with reference to FIG. 4. FIG. 4 is a schematic diagram of transmission of an optical signal along different OMSs according to this embodiment.

As shown in FIG. 4, an example in which the source network device 300 already stores three pieces of different OMS link information is used for description. The three pieces of different OMS link information are used to indicate paths on which the optical signal is transmitted along three different OMSs (for example, an OMS 401, an OMS 402, and an OMS 403 shown in FIG. 4). The OMS 403 is used as a specific example. The OMS 403 includes three network devices, namely, the source network device 300, an intermediate network device 410, and a target network device 411 that are sequentially connected by using an optical fiber. For the description of the source network device, the intermediate network device, and the target network device, refer to FIG. 1 for details. Details are not described. It can be learned that the OMS link information used to indicate the OMS 403 is used to indicate a path on which the optical signal is sequentially transmitted along the source network device 300, the intermediate network device 410, and the target network device 411.

Step 202: The source network device determines a first output port based on the OMS link information.

An objective of performing, by the source network device, the method shown in this embodiment is to perform operation and maintenance on an optical fiber connected between any two adjacent network devices included in the OMS. For the description of operation and maintenance, refer to the foregoing description for details, and details are not described. The source network device shown in this embodiment can implement, based on the stored OMS link information, automatic operation and maintenance on the OMS indicated by the OMS link information. For example, when the source network device already stores a plurality of pieces of OMS link information, the source network device may perform the method shown in this embodiment on the plurality of pieces of OMS link information in a polling manner, to implement operation and maintenance on each OMS. In another example, the source network device may periodically perform the method shown in this embodiment on each piece of OMS link information, to implement operation and maintenance on each OMS, and the like. Details are not limited in this embodiment. For example, in another scenario, the source network device may also randomly perform the method shown in this embodiment on a plurality of pieces of OMS link information, to implement random operation and maintenance on each OMS, and the like.

It can be learned that, the source network device shown in this embodiment does not require manual input of routing information, but based on the stored OMS link information, the source network device can automatically implement operation and maintenance on the optical fiber connected between any two adjacent network devices included in the OMS, to improve efficiency and accuracy of performing operation and maintenance on the optical fiber.

Figure 5:
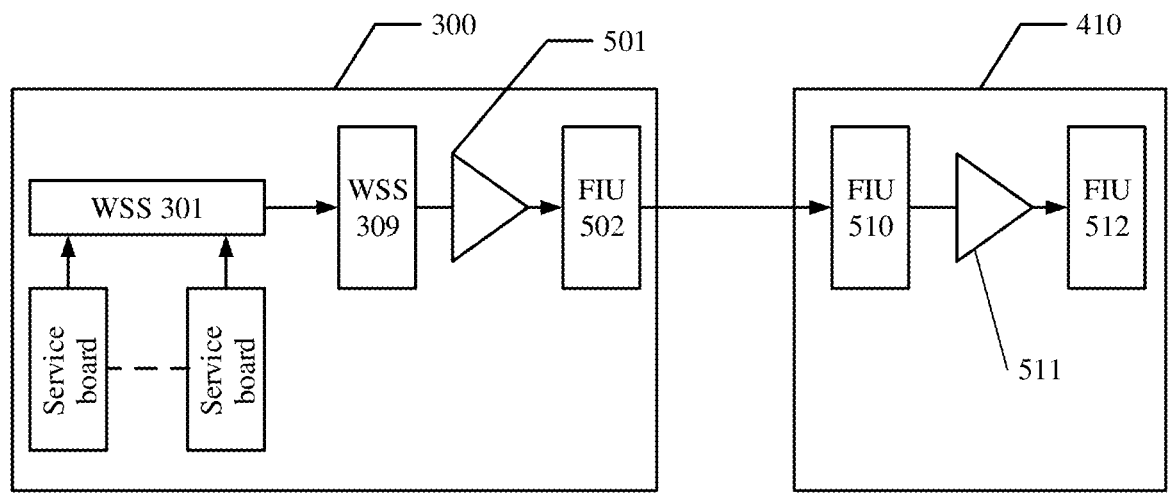
FIG. 5 is a schematic diagram of a structure of a source network device and an intermediate network device that are interconnected and included in a target optical multiplexing section according to this application.

The source network device shown in this embodiment may determine the first output port based on target OMS link information to be operated and maintained, where the target OMS link information is one of the plurality of pieces of OMS link information stored by the source network device, and the target OMS link information is used to indicate the target OMS to be operated and maintained. The source network device is connected to a downstream network device via the first output port by using a first optical fiber, and the downstream network device is a network device that is included in the target OMS and that is connected to the source network device. For better understanding, the following provides description by using examples with reference to FIG. 4 and FIG. 5. FIG. 5 is a schematic diagram of a structure of a source network device and an intermediate network device that are connected to each other and that are included in a target OMS according to this embodiment. The following describes a process in which the source network device determines the first output port.

First, the source network device determines the target OMS link information to be operated and maintained from the stored plurality of pieces of OMS link information. For example, the target OMS link information is used to indicate the target OMS 403 shown in FIG. 4.

Second, the source network device determines the first output port based on the target OMS link information. The source network device 300 is connected to the downstream network device by using the first output port. To be specific, the source network device 300 transmits the optical signal to the downstream network device via the first output port, to sequentially transmit the optical signal along the network devices included in the target OMS. It can be learned that the downstream network device is a network device that is directly connected to the source network device by using an optical fiber and that is indicated by the target OMS link information. When the target OMS is the OMS 403, the source network device 300 is connected to the intermediate network device 410 via the first output port.

It can be learned that when the target OMS link information includes the intermediate network device, the downstream network device is the intermediate network device connected to the source network device; or when the target OMS link information does not include the intermediate network device, the downstream network device is the target network device.

For example, with reference to FIG. 3 and FIG. 4, when the source network device 300 determines that the target OMS link information to be operated and maintained is used to indicate the target OMS 403 shown in FIG. 4, the first output port corresponding to the target OMS 403 may be determined. Specifically, the WSS 301 transmits an optical signal generated by a service board to the WSS 309 connected to the first output port, and after a transmission direction of the optical signal is deflected by the WSS 301 and the WSS 309, the optical signal can be output from the source network device 300 via the first output port. Further, the optical signal is transmitted along the network devices included in the target OMS 403 until the optical signal is transmitted to the target network device 411, to transmit the optical signal along the network devices included in the target OMS 403.

The following further describes the first output port with reference to FIG. 5.

The WSSs located at different locations in this embodiment are configured to transmit the optical signal to different OMSs, so that the optical signal whose transmission direction is deflected by the different WSSs can be output from the source network device in different dimensional directions. In this embodiment, an example in which the WSS 309 is configured to input the optical signal to the target OMS 403 to be operated and maintained is used for description.

In this embodiment, an optical amplifier 501 and a fiber interface board (fiber interface board, FIU) 502 are sequentially connected to the WSS 309 by using an optical fiber.

Optionally, the first output port shown in this embodiment may be an output port of the optical amplifier 501. To be specific, the optical signal from the WSS 309 is transmitted to the intermediate network device 410 via the first output port of the optical amplifier 501. Optionally, the first output port shown in this embodiment may be alternatively the FIU 502. To be specific, the optical signal from the optical amplifier 501 is transmitted to the intermediate network device 410 via the FIU 502. In this embodiment, an example in which the first output port is the output port of the optical amplifier 501 is used for description.

Step 203: The source network device obtains, on the first output port, a first output power value of the optical signal.

Optionally, still as shown in FIG. 5, when the source network device 300 determines that the first output port is the output port of the optical amplifier 501, the source network device 300 may obtain the first output power value that is of the optical signal and that is output via the output port of the optical amplifier 501. Optionally, when the source network device 300 determines that the first output port is the output port of the FIU 502, the source network device 300 may obtain the first output power value that is of the optical signal and that is output via the output port of the FIU 502.

Step 204: The source network device sends the first output power value to the intermediate network device by using the first optical fiber.

Still as shown in FIG. 4 and FIG. 5, the first optical fiber shown in this embodiment is an optical fiber connected between the source network device 300 and the intermediate network device 410, and the source network device 300 transmits the first output power value to the intermediate network device 410 by using the first optical fiber. Specifically, if the first output port is the output port of the optical amplifier 501, the first optical fiber includes two sections: an optical fiber between the optical amplifier 501 and the FIU 502 and an optical fiber connected between the FIU 502 and the intermediate network device 410. If the first output port is the output port of the FIU 502, the first optical fiber is an optical fiber connected between the FIU 502 and the intermediate network device 410.

The following describes how the source network device specifically sends the first output power value.

Optionally, the source network device transmits a first optical supervisory channel (optical supervisory channel, OSC) by using the first optical fiber, to send the first output power value to the intermediate network device. The first OSC is configured to transmit data obtained by monitoring a process of transmitting the optical signal between different network devices. In other words, a main function of the first OSC is to monitor transmission of the optical signal between the network devices.

Specifically, the source network device 300 may transmit a plurality of paths of optical signals having different wavelengths to the intermediate network device 410. For example, the source network device 300 transmits five paths of optical signals to the intermediate network device 410, and the wavelengths of the optical signals are respectively: $\lambda_1$, $\lambda_2$, $\lambda_3$, $\lambda_4$, and $\lambda_5$. $\lambda_2$, $\lambda_3$, $\lambda_4$, and $\lambda_5$ may be optical signals carrying services. To monitor a transmission process of the optical signals carrying services, transmission may be monitored by using an optical signal having a wavelength of $\lambda_1$ (namely, the first OSC). To implement a monitoring function of the first OSC, monitoring information, operation administration and maintenance (operation administration and maintenance, OAM) information, and the like may be transferred by using the first OSC.

In this embodiment, information (the monitoring information, the OAM information, and the like) to be transmitted by using the first OSC is encapsulated into a data frame, and the data frame is modulated to the first OSC. Still using FIG. 5 as an example, the source network device 300 encapsulates the information to be transmitted by using the first OSC into a data frame, and modulates the data frame to the first OSC, and the FIU 502 multiplexes the first OSC with the optical signal from the optical amplifier 501, and transmits data to the intermediate network device 410 by using the first optical fiber. A specific encapsulation manner is not limited in this embodiment. For example, the encapsulation may be Ethernet frame encapsulation.

In this embodiment, the first output power value may be transmitted by using the first OSC. Specifically, the source network device 300 encapsulates the first output power value into a first byte in an overhead area of the data frame, where the first byte occupies target bandwidth of the first OSC. A quantity and a specific location of the first byte are not limited in this embodiment, provided that both the source network device 300 and the intermediate network device 410 already determine that the first byte is used to carry the first output power value.

Optionally, the overhead area of the data frame that is already modulated on the first OSC in this embodiment includes the first byte and a second byte, and the first byte and the second byte are mutually different bytes included in the overhead area of the data frame. The first byte is used to carry the first output power value, and the second byte is a byte occupied by a DCN channel. It can be learned that the DCN channel does not occupy the target bandwidth. The DCN channel occupies the second byte to transmit related information used to manage and/or maintain the network device. Specific information transmitted by the DCN is not limited in this embodiment.

An advantage of transmitting the first output power value by using the target bandwidth of the first OSC lies in that, when receiving each path of optical signal that passes through the first optical fiber, the intermediate network device only needs to parse the first OSC to obtain the first output power value. Still with reference to the foregoing example, the FIU 502 of the intermediate network device 410 demultiplexes the signal from the first optical fiber to obtain optical signals used to carry services (namely, optical signals with wavelengths of $\lambda_2$, $\lambda_3$, $\lambda_4$, and $\lambda_5$), and the first OSC used to carry information such as the first output power value (namely, an optical signal with a wavelength of $\lambda_1$). The first byte and the second byte shown in this embodiment are different from each other, so that transmission of the first output power value does not occupy a DCN channel. In this way, the source network device 300 does not need to occupy bandwidth of the DCN channel in a process of transmitting the first output power value to the intermediate network device 410. This improves bandwidth utilization of the DCN channel, and avoids impact of transmission of the first output power value on the DCN channel.

Step 205: The intermediate network device obtains, on an input port, the first input power value of the optical signal.

In this embodiment, a device type of the intermediate network device is not limited, provided that the intermediate network device can forward the optical signal from the source network device to the target network device. In this embodiment, an example in which the intermediate network device is an optical line amplifier (optical line amplifier, OLA) is used for description. For a specific structure of the intermediate network device, refer to FIG. 5. It should be clearly noted that the description of the specific structure of the intermediate network device in this embodiment is an optional example. This is not limited.

As shown in FIG. 5, it can be learned that the intermediate network device 410 includes an FIU 510, an optical amplifier 511, and an FIU 512 that are sequentially connected by using an optical fiber. For the specific description of the FIUs and the optical amplifiers, refer to the foregoing description for details, and details are not described. It can be learned from the foregoing description shown in FIG. 3 that the source network device includes a plurality of output ports connected to the WSSs (the WSS 302 to the WSS 309) located at different locations, and the optical signal is output from the different output ports, so that the optical signal can be transmitted in different directions. The intermediate network device has only one input port and one output port, the intermediate network device does not need to change a transmission direction of the optical signal, and the intermediate network device is only configured to transmit, to the output port, the optical signal input from the input port, to output the optical signal from the intermediate network device. It can be learned that the intermediate network device is only configured to forward the optical signal.

It can be learned from the foregoing that a start point of the first optical fiber may be connected to the output port of the optical amplifier 501, or may be connected to the output port of the FIU 502, and an end point of the first optical fiber may be connected to the input port of the FIU 510 of the intermediate network device 410, or may be connected to the input port of the optical amplifier 511 of the intermediate network device 410. In this embodiment, an example in which the end point of the first optical fiber is connected to the input port of the optical amplifier 511 is used for description. For example, an FIU 601 of the intermediate network device 410 demultiplexes the received optical signal to obtain the optical signal used to carry the service and the first OSC. For the specific description of the optical signal used to carry the service and the first OSC, refer to step 204 for details. Details are not described. The FIU 601 transmits, to an optical amplifier 602, the optical signal used to carry the service, and the intermediate network device 410 may obtain, on an input port of the optical amplifier 602, the first input power value of the optical signal used to carry the service.

Step 206: The intermediate network device obtains optical fiber attenuation of the first optical fiber.

The intermediate network device shown in this embodiment can obtain the optical fiber attenuation of the first optical fiber based on the first output power value and the first input power value that is obtained on the input port of the intermediate network device. Specifically, the intermediate network device may obtain the optical fiber attenuation of the first optical fiber based on the following formula 1:

$$\text{Fiber attenuation of the first optical fiber} = P_{out} - P_{in} - \text{target attenuation.} \quad \text{Formula 1:}$$

Pout is the first output power value shown above, and Pin is the first input power value obtained on the input port of the intermediate network device. As shown in FIG. 5, if the start point of the first optical fiber is the output port of the optical amplifier 501 and the end point is the input port of the optical amplifier 511, the target attenuation includes a sum of intrinsic attenuation of the FIU 502, intrinsic attenuation of the FIU 510, and an attenuation value of a variable optical attenuator (VOA) connected between the optical amplifier 511 and the FIU 510.

In this embodiment, an example in which the intermediate network device obtains the optical fiber attenuation of the first optical fiber is used for description. In another example, the intermediate network device may alternatively send the first output power value of the source network device and the first input power value that is obtained on the input port of the intermediate network device to the target network device. Further, the target network device calculates the optical fiber attenuation of the first optical fiber based on the foregoing formula 1. It can be learned that, in this example, the target network device of the target OMS can obtain a target input power value and a target output power value, and further calculate the optical fiber attenuation of the target optical fiber based on the formula 1. The target input power value is a power value that is of the optical signal and that is input to the target optical fiber, the target output power value is a power value that is of the optical signal and that is output from the target optical fiber, and the target optical fiber is the first optical fiber connected between the source network device and the intermediate network device; and/or, the target optical fiber is an optical fiber connected between any two adjacent intermediate network devices included in the target OMS.

Step 207: The intermediate network device obtains a second output power value on the output port.

In this embodiment, for the specific description of obtaining, by the intermediate network device, the second output power value on the output port, refer to the specific description of obtaining, by the source network device on the first output port, the first output power value of the optical signal, as shown in step 203. Details are not described.

Step 208: The intermediate network device sends the optical fiber attenuation of the first optical fiber and the second output power value to the target network device.

In this embodiment, for a process in which the intermediate network device sends the optical fiber attenuation of the first optical fiber and the second output power value that is obtained on the output port of the intermediate network device, refer to the specific process in which the source network device sends the first output power value to the intermediate network device, as shown in step 204. Details are not described.

In this embodiment, the intermediate network device and the target network device are connected by using a second optical fiber. Optionally, if the second optical fiber transmits one second OSC, the intermediate network device may send the second output power value and the optical fiber attenuation of the first optical fiber to the target network device by using a third byte modulated on the second OSC. To be specific, the third byte of the second OSC already carries the second output power value and the optical fiber attenuation of the first optical fiber. The third byte occupies target bandwidth of the second OSC. For the description of the third byte, refer to the description of the first byte in step 204. In this embodiment, an example in which the location of the first byte in the overhead area of the data frame that is already modulated on the first OSC is the same as the location of the third byte in the overhead area of the data frame that is already modulated on the second OSC is used for description. In another example, the location of the first byte in the overhead area of the data frame that is already modulated on the first OSC may also be different from the location of the third byte in the overhead area of the data frame that is already modulated on the second OSC.

In this embodiment, the overhead area of the data frame that is already modulated on the second OSC includes the third byte and a fourth byte, and the third byte and the fourth byte are mutually different bytes included in the overhead area of the data frame. The fourth byte is a byte occupied by the DCN channel. For the specific description of the fourth byte, refer to the foregoing description of the second byte for details. It can be learned that the target bandwidth shown in this embodiment is not occupied by the DCN channel.

Still optionally, when the second optical fiber is used to transmit two or more second OSCs, the plurality of second OSCs transmitted by the second optical fiber have different wavelengths. The intermediate network device may send the second output power value and the optical fiber attenuation of the first optical fiber to the target network device by using third bytes of different second OSCs. For example, the second optical fiber is used to transmit the second OSC with a wavelength of $\lambda_1$ and the second OSC with a wavelength of $\lambda_2$. The third byte of the second OSC with the wavelength of $\lambda_1$ is used to carry the optical fiber attenuation of the first optical fiber, and the third byte of the second OSC with the wavelength of $\lambda_2$ is used to carry the second output power value.

In this embodiment, an example in which the downstream network device of the intermediate network device is the target network device is used for description. In another example, the downstream network device of the intermediate network device may be alternatively another intermediate network device. A quantity of intermediate network devices connected between the source network device and the target network device is not limited in this embodiment. For a process of performing the method shown in this embodiment on another intermediate network device, refer to step 205 to step 208 for details. Details are not described.

In this embodiment, the source network device 300 and the intermediate network device 410 are located in a first DCN, and the target network device is located in a second DCN. It can be learned that the DCN in which the source network device 300 is located is different from the DCN in which the target network device 411 is located. When the intermediate network device 410 and the target network device 411 are located in different DCNs, by using the method shown in this embodiment, the intermediate network device 410 can send, to the target network device 411, related information used to perform detection on the target OMS (for example, information such as the second output power value and the optical fiber attenuation of the first optical fiber) by using the third byte of the second OSC transmitted by the second optical fiber. An advantage of performing cross-DCN transmission by using the third byte of the second OSC lies in that, the intermediate network device 410 sends, by using the target bandwidth of the second OSC, the related information used to perform detection on the target OMS, and bandwidth of the DCN channel does not need to be occupied. This alleviates impact of the target bandwidth of the second OSC on the DCN channel of the second OSC.

When the intermediate network device shown in this embodiment obtains the optical fiber attenuation of the first optical fiber and the second output power value, the intermediate network device may directly send the optical fiber attenuation of the first optical fiber and the second output power value to the target network device without storage or analysis, thereby saving resources of the intermediate network device and reducing load on the intermediate network device.

Step 209: The target network device receives the second output power value and the optical fiber attenuation of the first optical fiber from the intermediate network device.

Figure 6:
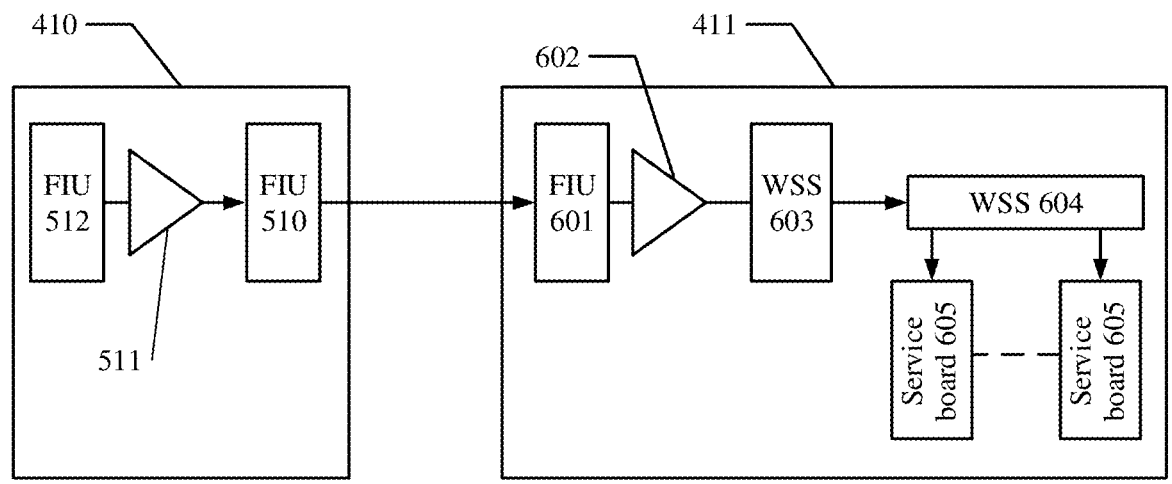
FIG. 6 is a schematic diagram of a structure of a target network device and an intermediate network device connected to the target network device according to this application.

For better understanding, the following provides description with reference to FIG. 6. FIG. 6 is a schematic diagram of a structure of a target network device and an intermediate network device connected to the target network device in this embodiment.

In this embodiment, the target network device 411 includes the FIU 601, the optical amplifier 602, a WSS 603, a WSS 604, and a service board 605 that are sequentially connected by using an optical fiber. For the specific description, refer to the description of the structure of the source network device 300 in FIG. 5. Details are not described.

The optical fiber connected between the intermediate network device 410 and the target network device 411 is the second optical fiber. Optionally, a start point of the second optical fiber may be an output port of the optical amplifier 511 of the intermediate network device 410, or an output port of the FIU 510 of the intermediate network device. An end point of the second optical fiber is an input port of the target network device 411. The input port may be an input port of the FIU 601 of the target network device 411, or an input port of the optical amplifier 602. In this embodiment, an example in which the start point of the second optical fiber is the output port of the optical amplifier 511 of the intermediate network device 410, and the end point of the second optical fiber is the input port of the optical amplifier 602 of the target network device 411 is used for description.

The intermediate network device 410 transmits the second output power value and the optical fiber attenuation of the first optical fiber to the target network device 411 by using the target bandwidth of the second OSC transmitted by the second optical fiber. For the description of the target bandwidth of the second OSC of the second optical fiber, refer to the foregoing description of the target bandwidth of the first OSC transmitted by the first optical fiber for details. Refer to step 204 for details. Details are not described. The target network device 411 may parse the second OSC to obtain the data frame. For the specific description of the data frame, refer to the foregoing step 204 for details. Details are not described. The target network device 411 may obtain the second output power value and the optical fiber attenuation of the first optical fiber that are carried by the third byte of the overhead area of the data frame. In this embodiment, an example in which one intermediate network device is connected between the source network device and the target network device is used. When a plurality of intermediate network devices are connected between the source network device and the target network device, the target network device may further receive, by using the target bandwidth of the second OSC, the optical fiber attenuation of the optical fiber connected between any two adjacent intermediate network devices.

In this embodiment, the target network device already stores a plurality of pieces of OMS link information. For the specific description of the OMS link information, refer to step 201 for details. Details are not described. In this embodiment, when the target network device receives, by using the input port, the optical signal that is from the intermediate network device and that already carries the second output power value and the optical fiber attenuation of the first optical fiber, the target network device determines that the OMS link information corresponding to the input port is the target OMS link information. Specifically, the target network device may pre-create a correspondence that is between different input ports and different OMS link information and that is included in the target network device. When one input port receives the optical signal, it may be determined that the OMS link information corresponding to the input port is the target OMS link information.

Using FIG. 4 as an example, the target network device 411 receives the optical signal from the intermediate network device 410 by using the input port connected to the second optical fiber, and the target network device 411 may determine that the OMS link information corresponding to the input port is the target OMS link information. The target OMS link information is used to indicate the target OMS 403. For the description of the target OMS link information used to indicate the target OMS 403, refer to the foregoing step 202 for details. Details are not described.

The target network device 411 may determine, based on the target OMS link information, that the target network device 411 is the last network device in the target OMS 403. The target network device 411 is configured to convert the optical signal that is from the source network device 300 and that is used to carry a service into an electrical signal, to transmit the electrical signal to a corresponding client device. Specifically, the target network device 411 no longer forwards the optical signal from the intermediate network device 410 to another network device. To be specific, after receiving the optical signal carrying the service, the target network device 411 transmits the optical signal to the service board 605 sequentially through the FIU 601, the WSS 603, and the WSS 604. The service board 605 is configured to convert the optical signal carrying the service into an electrical signal, to transmit the electrical signal to a corresponding client device.

Step 210: The target network device obtains, on an input port, a second input power value of the optical signal.

In this embodiment, when the target network device determines, based on the target OMS link information, that the target network device is the last network device in the target OMS, the target network device may obtain, on the input port connected to the second optical fiber, the second input power value of the optical signal.

Step 211: The target network device obtains optical fiber attenuation of the second optical fiber.

The target network device may obtain the optical fiber attenuation of the second optical fiber based on the obtained second input power value and the second output power value from the intermediate network device. For a process in which the target network device obtains the optical fiber attenuation of the second optical fiber, refer to the process in which the intermediate network device obtains the optical fiber attenuation of the first optical fiber in step 207. Details are not described.

Optionally, the target network device shown in this embodiment receives the optical fiber attenuation of the first optical fiber connected between the source network device and the intermediate network device that are included in the target OMS. If a plurality of intermediate network devices are connected between the source network device and the target network device, the target network device further receives the optical fiber attenuation of the optical fiber connected between any two adjacent intermediate network devices. In this case, when the target network device receives the foregoing optical fiber attenuation, the target network device may add a timestamp to each optical fiber attenuation based on a moment at which each optical fiber attenuation is received, and the timestamp is used to indicate a time at which each optical fiber attenuation is received.

It can be learned that, by using the method shown in this embodiment, without manual input of routing information, the source network device can automatically discover the target network device based on the target OMS link information, and can further obtain the optical fiber attenuation of the optical fiber connected between any two adjacent network devices included in the target OMS. In this way, efficiency and accuracy of detecting optical fiber attenuation are improved.

Another execution process of the optical power value transmission method provided in this application is described below with reference to FIG. 7A and FIG. 7B. In the method shown in this embodiment, deterioration of an optical fiber connected between any two adjacent network devices in a target OMS can be timely warned. For a specific execution process, refer to the following for details.

Step 701: A source network device obtains OMS link information.

Step 702: The source network device determines a first output port based on the OMS link information.

For a specific execution process of step 701 and step 702 shown in this embodiment, refer to step 201 and step 202 shown in FIG. 2 for details. Details are not described.

Step 703: The source network device obtains a plurality of first output power values within a first preset time period.

For a specific process in which the source network device obtains the first output power values in this embodiment, refer to step 203 shown in FIG. 2 for details. Details are not described. A difference from step 203 shown above lies in that the source network device shown in this embodiment presets the first preset time period, and a specific duration length of the first preset time period is not limited in this embodiment. For example, in this embodiment, an example in which the length of the first preset time period is two seconds is used for description.

The source network device detects optical power of an optical signal on a first output port for N times within the first preset time period, to obtain the plurality of first output power values. A specific value of N is not limited in this embodiment, provided that N is a positive integer greater than or equal to 2. In this embodiment, an example in which the value of N is 5 is used for description. It can be learned that the source network device shown in this embodiment detects the first output power value of the optical signal on the first output port for five consecutive times within two seconds, so that the source network device can obtain five first output power values within two seconds.

Step 704: The source network device determines whether an absolute value of a difference between two first output power values is greater than or equal to a first preset value, and if the absolute value of the difference between two first output power values is greater than or equal to the first preset value, performs step 705; or if the absolute value of the difference between two first output power values is not greater than or equal to the first preset value, performs step 706.

As shown in this embodiment, when the source network device already obtains N first output power values, it may be determined whether the absolute value of the difference between two first output power values included in the N first output power values is greater than or equal to the first preset value. Optionally, the source network device may obtain a difference between any two first output power values in the N first output power values. Still optionally, the source network device may obtain a difference between the first output power value with a largest value and the first output power value with a smallest value in the N first output power values. In this embodiment, an example in which the source network device determines whether an absolute value of a difference between the first output power value with the largest value and the first output power value with the smallest value in the N first output power values is greater than or equal to the first preset value is used for description.

The shown source network device presets the first preset value. A specific size of the first preset value is not limited in this embodiment, provided that when the absolute value of the difference between the first output power value with the largest value and the first output power value with the smallest value is greater than or equal to the first preset value, it indicates that a deterioration risk of the first optical fiber is high, and when the absolute value of the difference between the first output power value with the largest value and the first output power value with the smallest value is less than the first preset value, it indicates that the deterioration risk of the first optical fiber is low. In this embodiment, an example in which the first preset value is 1 dB (decibel) is used for description.

It can be learned that when the source network device determines that the absolute value of the difference between the two first output power values is greater than or equal to the first preset value, the source network device is triggered to perform step 705. When the source network device determines that the absolute value of the difference between the two first output power values is less than the first preset value, the source network device is triggered to perform step 706.

Step 705: The source network device sends the first output power values to an intermediate network device by using the first optical fiber.

In this embodiment, when the source network device determines that the absolute value of the difference between the two first output power values is greater than or equal to the first preset value, it indicates that the deterioration risk of the first optical fiber is high, and the source network device immediately sends the first output power values to the intermediate network device.

Optionally, the source network device may send any first output power value in the N first output power values to the intermediate network device. Still optionally, the source network device may send the first output power value in the N first output power values that is obtained at the last moment within the first preset time period to the intermediate network device, and the like. Details are not limited in this embodiment.

Step 706: The source network device sends the first output power values to the intermediate network device every other second preset time period.

When the source network device determines that the absolute value of the difference between the two first output power values is less than the first preset value, it indicates that the deterioration risk of the first optical fiber is low, and the source network device does not need to immediately send the first output power values to the intermediate network device. In addition, the first output power values may be periodically sent to the intermediate network device, and duration of the period is the second preset time period, so that the source network device sends the first output power values to the intermediate network device every other second preset time period.

In this embodiment, duration of the second preset time period is not limited, provided that the second preset time period is greater than the first preset time period. For example, in an example in which the first preset time period is two seconds, in this embodiment, an example in which the second preset time period is five seconds is used for description. It can be learned that the source network device shown in this embodiment may send the output power value once to the intermediate network device every other five seconds, to trigger the intermediate network device to detect optical fiber attenuation of the first optical fiber.

Step 707: The intermediate network device obtains, on an input port, a first input power value of the optical signal.

In this embodiment, when the intermediate network device receives the first output power values from the source network device, the intermediate network device may obtain the first input power value. For a specific process in which the intermediate network device obtains the first input power value, refer to step 205 shown in FIG. 2 for details. Details are not described.

Step 708: The intermediate network device obtains the optical fiber attenuation of the first optical fiber.

For a specific execution process of step 708 shown in this embodiment, refer to step 206 shown in FIG. 2. Details are not described.

Step 709: The intermediate network device obtains a plurality of second output power values within the first preset time period.

For the description of obtaining, by the intermediate network device, the plurality of second output power values within the first preset time period in this embodiment, refer to the description of obtaining, by the source network device, the plurality of first output power values within the first preset time period in step 703. Details are not described.

Step 710: The intermediate network device determines whether an absolute value of a difference between two second output power values is greater than or equal to the first preset value, and if the absolute value of the difference between two second output power values is greater than or equal to the first preset value, performs step 711; or if the absolute value of the difference between two second output power values is not greater than or equal to the first preset value, performs step 712.

For a specific execution process of step 710 shown in this embodiment, refer to step 704. Details are not described.

Step 711: The intermediate network device sends the optical fiber attenuation of the first optical fiber and the second output power values to a target network device by using a second optical fiber.

Step 712: The intermediate network device sends the optical fiber attenuation of the first optical fiber and the second output power values to the target network device every other second preset time period.

For the specific description of sending, by the intermediate network device, the optical fiber attenuation of the first optical fiber to the target network device in this embodiment, refer to step 208 shown in FIG. 2. Details are not described.

For the specific process in which the intermediate network device sends the second output power values to the target network device in this embodiment, refer to the process in which the source network device sends the first output power values to the intermediate network device in step 705 and step 706. Details are not described.

Step 713: The target network device receives the second output power values and the optical fiber attenuation of the first optical fiber from the intermediate network device.

Step 714: The target network device obtains, on an input port, a second input power value of the optical signal.

Step 715: The target network device obtains optical fiber attenuation of the second optical fiber.

For the description of a specific execution process of step 713 to step 715 shown in this embodiment, refer to step 209 to step 211 shown in FIG. 2 for details. Details are not described.

By using the method shown in this embodiment, using the source network device as an example, before sending the first output power value to the downstream network device, the source network device can determine a deterioration risk of the first optical fiber based on a size relationship between the absolute value of the difference between the two first output power values within the first preset time period and the first preset value. If the deterioration risk of the first optical fiber is high (to be specific, the absolute value of the difference between the two first output power values within the first preset time period is greater than or equal to the first preset value), the source network device may immediately send the first output power value to the intermediate network device, to enable the intermediate network device to detect optical fiber attenuation of the first optical fiber, to determine whether the first optical fiber deteriorates, thereby improving timeliness of warning whether the first optical fiber deteriorates. If the deterioration risk of the first optical fiber is low (to be specific, the absolute value of the difference between the two first output power values within the first preset time period is less than the first preset value), the source network device may periodically send the first output power value to the intermediate network device, to reduce a data volume of the output power value sent by the source network device to an intermediate network device, thereby reducing a data volume that the intermediate network device needs to process.

Figure 8:
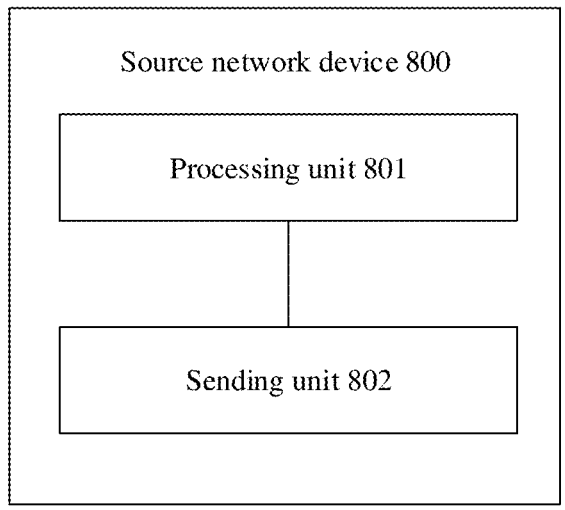
FIG. 8 is a schematic diagram of a structure of an embodiment of a source network device according to this application.

The foregoing describes the process of the optical power value transmission method provided in this application. The following describes in detail the source network device provided in this application based on the foregoing method. FIG. 8 is a schematic diagram of a structure of a source network device according to this application. The source network device 800 may include:

a processing unit 801, configured to obtain optical multiplexing section link information, where the optical multiplexing section link information is used to indicate an optical fiber connection relationship between any two adjacent network devices between the source network device and a target network device that are included in an optical multiplexing section, and the source network device and the target network device are located in different data communication networks DCN;

the processing unit 801 is further configured to determine a first output port of the source network device based on the optical multiplexing section link information, where the first output port is connected to a downstream network device by using a first optical fiber, and the downstream network device is a network device that is connected to the source network device and that is indicated by the optical multiplexing section link information; and the processing unit 801 is further configured to obtain, on the first output port, a first output power value of an optical signal; and a sending unit 802, configured to send the first output power value to the downstream network device by using the first optical fiber.

Figure 7A:
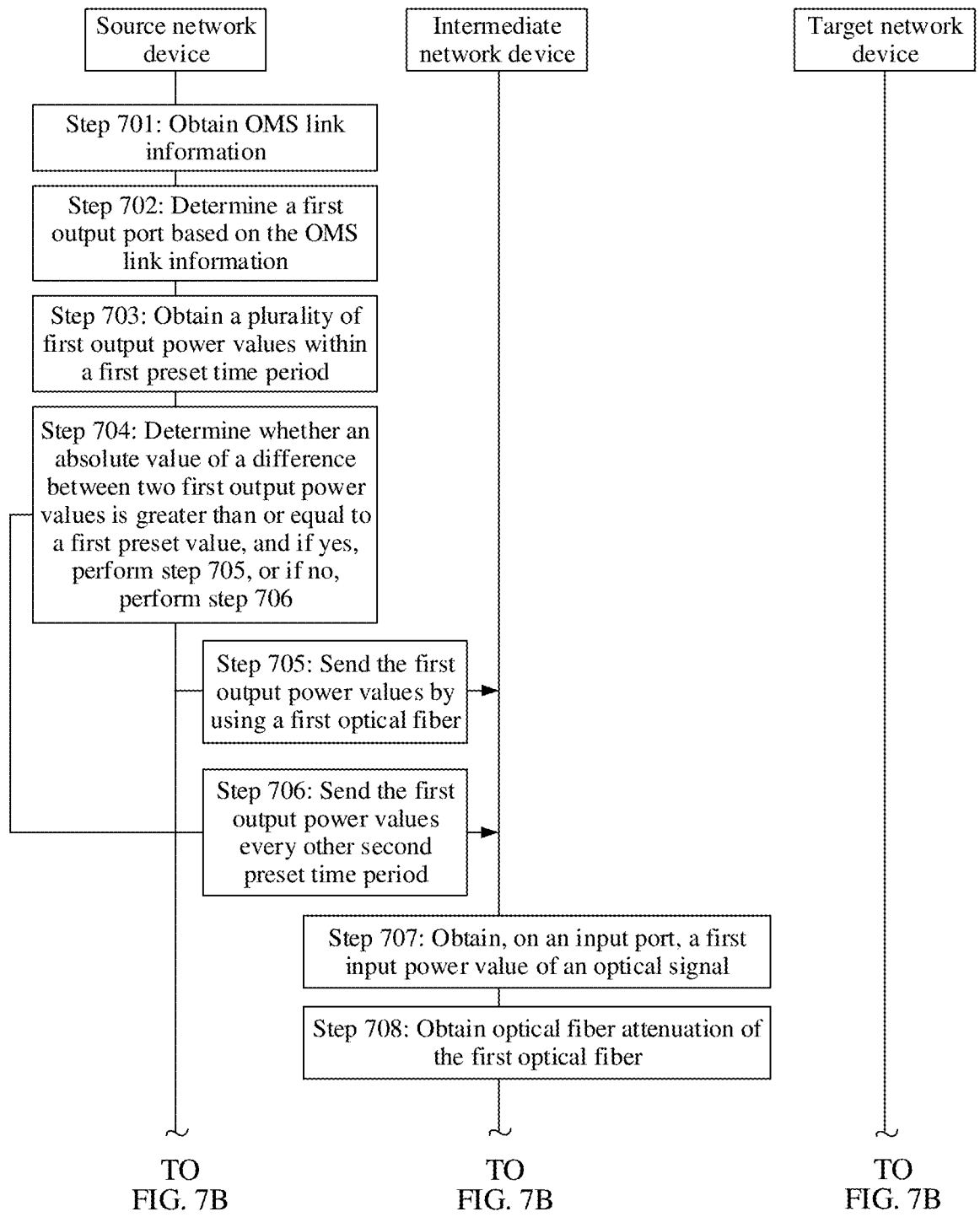
FIG. 7A and FIG. 7B are a flowchart of steps of another embodiment of an optical power value transmission method according to this application.
Figure 7B:
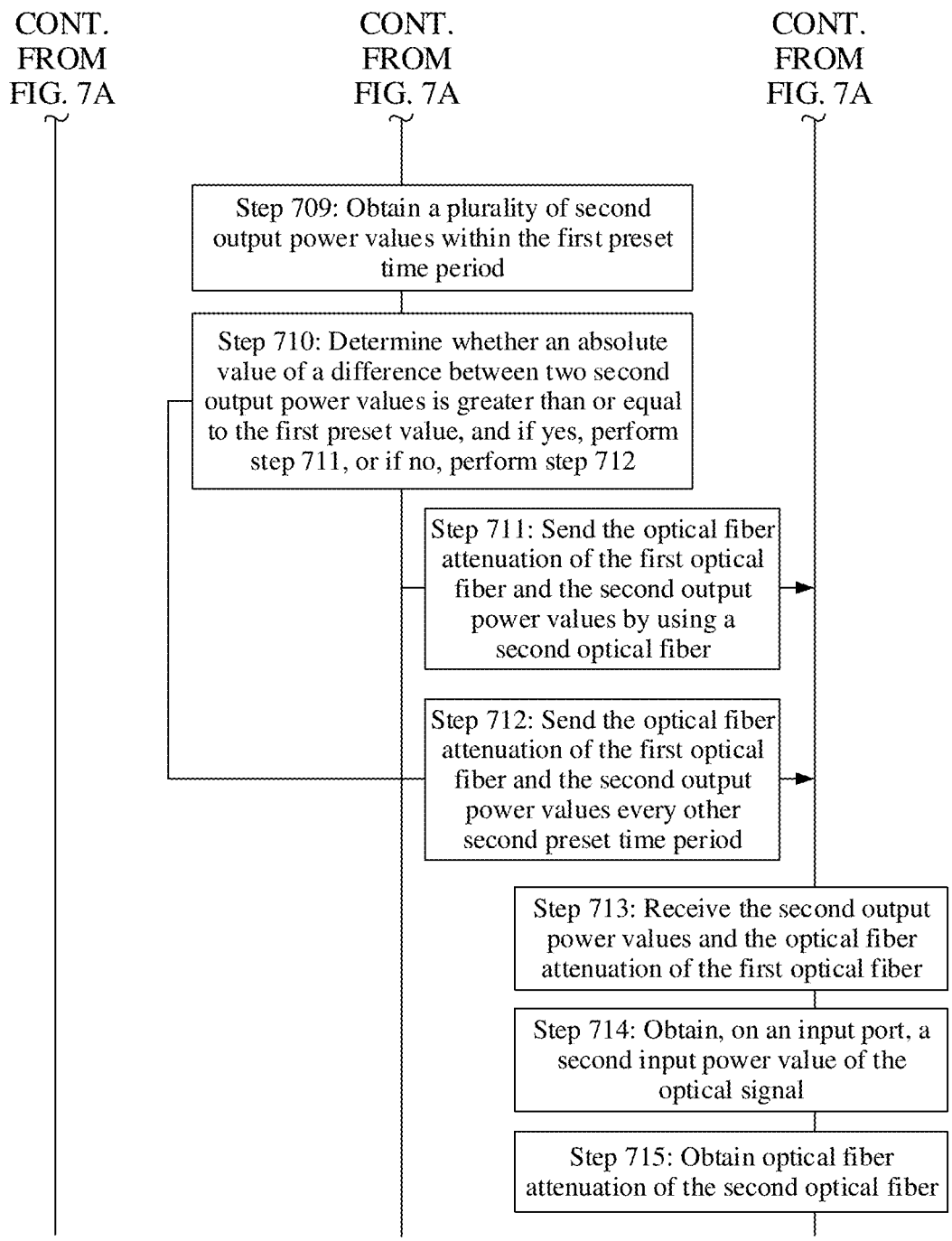

Refer to FIG. 2 or FIG. 7A and FIG. 7B for details of the description of the beneficial effects of the optical power value transmission method performed by the source network device 800 in this embodiment. Details are not described in this embodiment.

Optionally, the sending unit 802 is specifically configured to: send a first optical supervisory channel OSC by using the first optical fiber, where the first OSC carries the first output power value by using target bandwidth, and the target bandwidth is not occupied by a DCN channel.

Optionally, the processing unit 801 is further configured to: obtain a plurality of first output power values within a first preset time period; and determine whether that an absolute value of a difference between two of the plurality of first output power values is greater than or equal to a first preset value.

Optionally, the processing unit 801 is specifically configured to determine whether that the absolute value of the difference between the first output power value with a largest value and the first output power value with a smallest value in the plurality of first output power values is greater than or equal to the first preset value.

Optionally, the sending unit 802 is specifically configured to: if the source network device determines that the absolute value of the difference between the first output power value with the largest value and the first output power value with the smallest value in the plurality of first output power values is less than the first preset value, send the first output power value to the downstream network device every other second preset time period, where the second preset time period is greater than the first preset time period.

Figure 9:
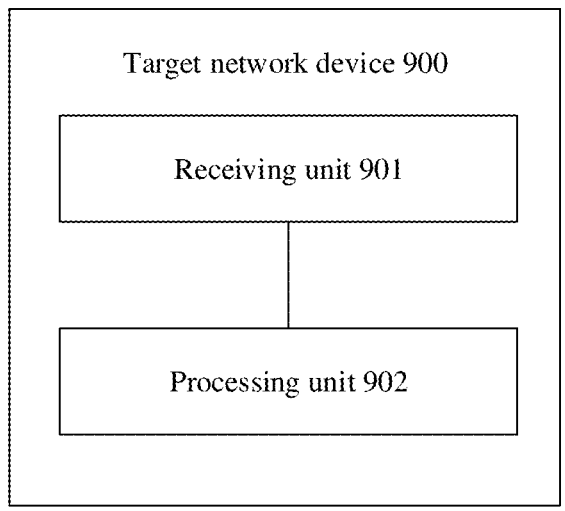
FIG. 9 is a schematic diagram of a structure of an embodiment of a target network device according to this application.

The following describes in detail the target network device provided in this application based on the foregoing method. FIG. 9 is a schematic diagram of a structure of a target network device according to this application. The target network device 900 may include:

- a receiving unit 901, configured to receive a second output power value from an upstream network device by using a second optical fiber, where the second output power value is a power value that is of an optical signal and that is obtained on an output port of the upstream network device, and the second optical fiber is an optical fiber connected between an input port of the network device and the upstream network device; and
- a processing unit 902, configured to determine, based on the input port and optical multiplexing section link information, that the network device is a target network device indicated by the optical multiplexing section link information, where the optical multiplexing section link information is used to indicate an optical fiber connection relationship between any two adjacent network devices between a source network device and the target network device that are included in an optical multiplexing section, and the source network device and the target network device are located in different data communication networks DCN; and
- the processing unit 902 is further configured to obtain, on the input port, an input power value of the optical signal.

Refer to FIG. 2 or FIG. 7A and FIG. 7B for details of the description of the beneficial effects of the optical power value transmission method performed by the target network device 900 in this embodiment. Details are not described in this embodiment.

Optionally, the receiving unit 901 is specifically configured to: receive a second OSC by using the second optical fiber, where the second OSC carries the second output power value by using target bandwidth, and the target bandwidth is not occupied by a DCN channel.

Optionally, the processing unit 902 is further configured to: obtain optical fiber attenuation of the second optical fiber at least based on the second output power value and the input power value.

Optionally, the optical multiplexing section includes at least one intermediate network device connected between the source network device and the target network device. The upstream network device is the intermediate network device connected to the target network device. The receiving unit 901 is further configured to receive target optical fiber attenuation by using the second optical fiber, where the target optical fiber attenuation is optical fiber attenuation of a first optical fiber connected between the source network device and the intermediate network device, and/or, the target optical fiber attenuation is optical fiber attenuation of an optical fiber connected between the two adjacent intermediate network devices.

Optionally, the optical multiplexing section includes at least one intermediate network device connected between the source network device and the target network device. The upstream network device is the intermediate network device connected to the target network device. The receiving unit 901 is further configured to receive a target input power value and a target output power value of a target optical fiber by using the second optical fiber, where the target input power value is a power value that is of the optical signal and that is input to the target optical fiber, the target output power value is a power value that is of the optical signal and that is output from the target optical fiber, and the target optical fiber is a first optical fiber connected between the source network device and the intermediate network device, and/or, the target optical fiber is an optical fiber connected between the two adjacent intermediate network devices; and the processing unit 902 is further configured to obtain optical fiber attenuation of the target optical fiber at least based on the target input power value and the target output power value.

Figure 10:
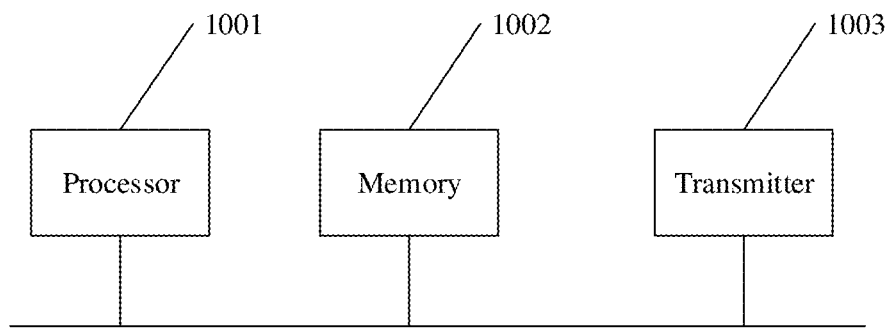
FIG. 10 is a schematic diagram of a structure of an embodiment of a network device according to this application.

FIG. 10 is a schematic diagram of a structure of a network device according to this application. The network device may include a processor 1001, a memory 1002, and a transmitter 1003. The processor 1001, the memory 1002, and the transmitter 1003 are interconnected by using a line. The memory 1002 stores program instructions and data.

The memory 1002 stores program instructions and data that correspond to the steps performed by the source network device in the implementations corresponding to FIG. 2 and FIG. 7A and FIG. 7B. The processor 1001 is configured to perform the processing-related steps that are performed by the source network device and that are shown in any embodiment of FIG. 2 and FIG. 7A and FIG. 7B. Specifically, in FIG. 2, the processor 1001 is specifically configured to perform step 201, step 202, and step 203. As shown in FIG. 7A, the processor 1001 is specifically configured to perform step 701, step 702, step 703, and step 704. The transmitter 1003 is configured to perform the sending-related steps that are performed by the source network device and that are shown in any embodiment in FIG. 2 and FIG. 7A and FIG. 7B. Specifically, in FIG. 2, the transmitter 1003 is configured to perform step 204, and in FIG. 7A, the transmitter 1003 is configured to perform step 705 and step 706.

Figure 11:
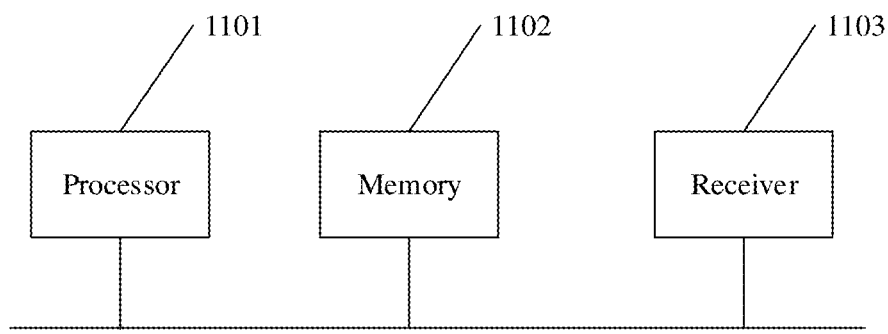
FIG. 11 is a schematic diagram of a structure of another embodiment of a network device according to this application.

FIG. 11 is a schematic diagram of a structure of a network device according to this application. The network device may include a processor 1101, a memory 1102, and a receiver 1103. The processor 1101, the memory 1102, and the receiver 1103 are interconnected by using a line. The memory 1102 stores program instructions and data.

The memory 1102 stores program instructions and data that correspond to the steps performed by the target network device in the implementations corresponding to FIG. 2 and FIG. 7A and FIG. 7B. The processor 1101 is configured to perform the processing-related steps that are performed by the target network device and that are shown in any embodiment in FIG. 2 and FIG. 7A and FIG. 7B. Specifically, in FIG. 2, the processor 1101 is specifically configured to perform step 210 and step 211. As shown in FIG. 7B, the processor 1101 is specifically configured to perform step 714 and step 715. The receiver 1103 is configured to perform the receiving-related steps that are performed by the target network device and that are shown in any embodiment in FIG. 2 and FIG. 7A and FIG. 7B. Specifically, in FIG. 2, the receiver 1103 is configured to perform step 209, and in FIG. 7B, the receiver 1103 is configured to perform step 713.

An embodiment of this application further provides a digital processing chip. The digital processing chip integrates a circuit configured to implement the function of the processor 1001 and one or more interfaces. When a memory is integrated into the digital processing chip, the digital processing chip may complete the method steps in any one or more embodiments in the foregoing embodiments. When no memory is integrated into the digital processing chip, the digital processing chip may be connected to an external memory by using an interface. The digital processing chip implements, based on program code stored in the external memory, the actions performed by the source network device, the intermediate network device, or the target network device in the foregoing embodiment.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical power value transmission method, wherein the method comprises:
    obtaining, by a source network device, optical multiplexing section link information, wherein the optical multiplexing section link information is useable to indicate an optical fiber connection relationship between two adjacent network devices between the source network device and a target network device, an optical multiplexing section comprises the two adjacent network devices, the source network device and the target network device, and the source network device and the target network device are located in different data communication networks (DCN);
    determining, by the source network device, a first output port of the source network device based on the optical multiplexing section link information, wherein the first output port is connected to a downstream network device by a first optical fiber, and the downstream network device is connected to the source network device, and is indicated by the optical multiplexing section link information;
    obtaining, by the source network device on the first output port, a first output power value of an optical signal; and
    sending, by the source network device, the first output power value to the downstream network device by the first optical fiber, wherein the sending, by the source network device, the first output power value to the downstream network device by the first optical fiber comprises:
        sending, by the source network device, a first optical supervisory channel (OSC) by the first optical fiber, wherein the first OSC includes a data frame that occupies a target bandwidth of the first OSC, and the data frame includes the first output power value, and the target bandwidth fails to be occupied by a DCN channel.

2. The method according to claim 1, wherein before the sending, by the source network device, the first output power value to the downstream network device by the first optical fiber, the method further comprises:
    obtaining, by the source network device, a plurality of first output power values within a first preset time period; and
    determining, by the source network device, whether an absolute value of a difference between two of the plurality of first output power values is greater than or equal to a first preset value.

3. The method according to claim 2, wherein the determining, by the source network device, whether the absolute value of the difference between the two of the plurality of first output power values is greater than or equal to the first preset value comprises:
    determining, by the source network device, whether an absolute value of a difference between the first output power value with a largest value in the plurality of first output power values and the first output power value with a smallest value in the plurality of first output power values is greater than or equal to the first preset value.

4. The method according to claim 3, wherein the sending, by the source network device, the first output power value to the downstream network device by the first optical fiber comprises:
    sending, by the network device, the first output power value to the downstream network device every other second preset time period in response to the source network device determining that the absolute value of the difference between the first output power value with the largest value in the plurality of first output power values and the first output power value with the smallest value in the plurality of first output power values is less than the first preset value, wherein the second preset time period is greater than the first preset time period.

5. An optical power value transmission method, wherein the method comprises:
    receiving, by a network device, a second output power value from an upstream network device by a second optical fiber, wherein the second output power value is a power value of an optical signal, and is obtained on an output port of the upstream network device, and the second optical fiber is connected between an input port of the network device and the upstream network device;
    determining, by the network device based on the input port and optical multiplexing section link information, that the network device is a target network device indicated by the optical multiplexing section link information, wherein the optical multiplexing section link information is useable to indicate an optical fiber connection relationship between two adjacent network devices between a source network device and the target network device, an optical multiplexing section comprises the two adjacent network devices, the source network device and the target network device, and the source network device and the target network device are located in different data communication networks (DCN); and
    obtaining, by the network device on the input port, an input power value of the optical signal, wherein the receiving, by the network device, the second output power value from the upstream network device by the second optical fiber comprises:
        receiving, by the network device, a second optical supervisory channel (OSC) by the second optical fiber, wherein the second OSC includes a data frame that occupies a target bandwidth of the second OSC, and the data frame includes the second output power value, and the target bandwidth fails to be occupied by a DCN channel.

6. The method according to claim 5, wherein after the obtaining, by the network device on the input port, the input power value of the optical signal, the method further comprises:
    obtaining, by the network device, an optical fiber attenuation of the second optical fiber based on at least the second output power value and the input power value.

7. The method according to claim 6, wherein the optical multiplexing section further comprises at least one intermediate network device connected between the source network device and the target network device, the upstream network device is the at least one intermediate network device connected to the target network device, and the method further comprises:
receiving, by the network device, a target optical fiber attenuation by the second optical fiber,
wherein the target optical fiber attenuation is an optical fiber attenuation of a first optical fiber connected between the source network device and the intermediate network device, or
the target optical fiber attenuation is an optical fiber attenuation of an optical fiber connected between the two adjacent intermediate network devices.

8. The method according to claim 6, wherein the optical multiplexing section further comprises at least one intermediate network device connected between the source network device and the target network device, the upstream network device is the intermediate network device connected to the target network device, and the method further comprises:
receiving, by the network device, a target input power value and a target output power value of a target optical fiber by the second optical fiber,
wherein the target input power value is a power value of the optical signal, and is input to the target optical fiber,
the target output power value is a power value of the optical signal, and is output from the target optical fiber, and
the target optical fiber is a first optical fiber connected between the source network device and the intermediate network device, or
the target optical fiber is an optical fiber connected between the two adjacent intermediate network devices; and
obtaining, by the network device, an optical fiber attenuation of the target optical fiber based on at least the target input power value and the target output power value.

9. A network device, comprising:
a processor,
a non-transitory memory, and
a transmitter, wherein
the non-transitory memory, the processor and the transmitter are connected together, the non-transitory memory is configured to store non-transitory instructions, and in response to the non-transitory instructions being executed by the processor, cause the network device to perform operations comprising:
obtain optical multiplexing section link information, wherein the optical multiplexing section link information is useable to indicate an optical fiber connection relationship between two adjacent network devices between the source network device and a target network device, an optical multiplexing section comprises the two adjacent network devices, the source network device and the target network device, and the source network device and the target network device are located in different data communication networks (DCN);
determine a first output port of the source network device based on the optical multiplexing section link information, wherein the first output port is connected to a downstream network device by a first optical fiber, and the downstream network device is connected to the source network device, and is indicated by the optical multiplexing section link information;
obtain, on the first output port, a first output power value of an optical signal; and
send the first output power value to the downstream network device by the first optical fiber, wherein in response to the non-transitory instructions being executed by the processor, that cause the network device to send the first output power value to the downstream network device by the first optical fiber comprises the processor being further configured to execute the non-transitory instructions that further cause the network device to perform operations further comprising:
send a first optical supervisory channel (OSC) by the first optical fiber, wherein the first OSC includes a data frame that occupies a target bandwidth of the first OSC, and the data frame includes the first output power value, and the target bandwidth fails to be occupied by a DCN channel.

10. The network device according to claim 9, wherein before the processor is configured to execute the non-transitory instructions that cause the network device to send the first output power value to the downstream network device by the first optical fiber, the processor is further configured to execute the non-transitory instructions that further cause the network device to perform operations further comprising:
obtain a plurality of first output power values within a first preset time period; and
determine whether an absolute value of a difference between two of the plurality of first output power values is greater than or equal to a first preset value.

11. The network device according to claim 10, wherein the processor configured to execute the non-transitory instructions that cause the network device to determine whether that an absolute value of a difference between two of the plurality of first output power values is greater than or equal to a first preset value comprises the processor being further configured to execute the non-transitory instructions that further cause the network device to perform operations further comprising:
determine whether an absolute value of a difference between the first output power value with a largest value in the plurality of first output power values and the first output power value with a smallest value in the plurality of first output power values is greater than or equal to the first preset value.

12. The network device according to claim 10, wherein the processor configured to execute the non-transitory instructions that cause the network device to send the first output power value to the downstream network device by using the first optical fiber comprises the processor being further configured to execute the non-transitory instructions that further cause the network device to perform operations further comprising:
send the first output power value to the downstream network device every other second preset time period in response to the processor being configured to execute the non-transitory instructions that cause the network device to determine that the absolute value of the difference between the first output power value with the largest value in the plurality of first output power values and the first output power value with the smallest value in the plurality of first output power values is less than the first preset value, wherein the second preset time period is greater than the first preset time period.

* * * * *